UNITED STATES PATENT OFFICE.

GEORG MONTAG AND FRIEDRICH KRESSER, OF MANNHEIM, GERMANY.

PROCESS OF CONVERTING EARTH OR SOIL INTO FUEL.

SPECIFICATION forming part of Letters Patent No. 655,102, dated July 31, 1900.

Application filed May 26, 1899. Serial No. 718,413. (No specimens.)

*To all whom it may concern:*

Be it known that we, GEORG MONTAG, engineer, and FRIEDRICH KRESSER, gentleman, subjects of the Grand Duke of Baden, residing at Mannheim, Grand Duchy of Baden, German Empire, have invented new and useful Improvements in Processes for the Conversion of Earth or Soil into Fuel, of which the following is a specification.

The present invention refers to an improved process for the conversion of earth or soil into fuel, the purpose of the invention being to prepare ordinary earth or soil in such a manner as to render same applicable as fuel in the shape of briquets.

The process for manufacturing our improved fuel consists in intimately mixing common earth or soil with a material more particularly referred to later on by aid of machinery or in any other suitable manner. The material thus produced is, after having been pressed in the form of briquets and after having been dried, ready for immediate use.

The material to be added to or mixed with the common earth or soil is prepared by boiling pitch or resin and thereupon after having added a quarter per cent., by weight, of oil residues or waste oils, preferably the least valuable ones, for the purpose of dilution in liquefying the pitch or resin, mixing the composition produced with a sufficient amount of sawdust or dry earth or soil or sawdust mixed with dry earth or soil to obtain a viscid paste, which will ultimately fall into pieces of small size. The oil addition, as stated, for the purpose of dilution in liquefying the pitch or resin enables the sawdust and dry earth or soil to more readily absorb the composition. This hot mass is then spread on plates and constantly and energetically turned over simultaneously, being sprayed or spinkled with a five-per-cent. sulfuric acid employed corresponding to a half up to one per cent., by weight, of the mixture or mass to be treated. The sulfuric acid serves the purpose of loosening the clay soil or heavy earth, so that the preparation can penetrate same more advantageously and cause a better combustion of the earth, the non-addition of such an acid causing an increased amount of residue to be left on combustion and similarly to the combustion of coal the earth would adhere to the fire-bars as cinders. To facilitate or promote the intimate mixing of the sulfuric acid with the prepared material, any sufficient amount of hot water may be added, the pap thus produced being constantly stirred until the mixture is satisfactorily effected. The resulting mixture of liquid consistence is then mixed with ordinary earth or soil. The amount of material employed for this purpose varies according to the quality of the earth or soil to be treated with it. An addition of six per cent., by weight, of the improved material will be found sufficient for light earth, while in connection with heavy earth, such as clay, up to eight per cent., by weight, of the material will have to be employed.

The earth or soil is intimately mixed with the prepared material by means of mixing apparatus or machinery or is in any other suitable manner mixed, pressed, and dried—in fact, treated in a manner similar to the products of coal-dust.

The ready prepared and dried bricks or pieces are ready for use for heating and like purposes as fuel without any further manipulation.

Having now particularly described and ascertained the nature of our said invention and in what manner the same is to be performed, we declare that what we claim is—

Process for the manufacture of fuel essentially composed of earth or soil, consisting in adding to disintegrated earth or soil according to its quality six to eight per cent. of a material prepared by intimately mixing pitch or resin with sawdust and earth, simultaneously adding a half to one per cent. of five-per-cent. sulfuric acid, and hot water, substantially as and for the purpose set forth.

In testimony whereof we have hereunto set our hands in presence of two subscribing witnesses.

GEORG MONTAG.
FRIEDRICH KRESSER.

Witnesses:
  OTTO WENDELMUTH,
  JACOB ADRIAN.